United States Patent Office 3,585,146
Patented June 15, 1971

3,585,146
DETERGENT SEQUESTRATION COMPOSITIONS CONTAINING STP AND NTA
Chung Yu Shen, St. Louis, Mo., and Norman Earl Stahlheber, Columbia, Ill., assignors to Monsanto Company, St. Louis, Mo.
No Drawing. Filed Nov. 20, 1967, Ser. No. 684,471
Int. Cl. C11d 7/16, 7/32, 11/00
U.S. Cl. 252—137                           1 Claim

ABSTRACT OF THE DISCLOSURE

A sequestration composition having a molar ratio of alkali metal nitrilotriacetate to alkali metal tripolyphosphate of from about 1:13 to about 2.2:1 and having a bulk density below about 0.6 gram per cc. and being substantially free of a string base; said salts being at least about 95% by weight of the total composition on an anhydrous basis and the process for producing sequestration compositions containing said salts utilizing alkali metal trimetaphosphate as one of the raw materials. The process comprises (a) preparing a mixture consisting essentially of at least about 13% by weight of water, from about 5% to 60% by weight of alkali metal nitrilotriacetate and an amount of alkali metal base; the molar ratio of said base to said triacetate being from about 1.1:1 to about 26:1; (b) adding to said mixture an amount of alkali metal trimetaphosphate sufficient to at least react with the base and a portion of the water and (c) drying the resulting composition to produce a detergent product which is substantially free of said base and which contains alkali metal nitrilotriacetate and alkali metal tripolyphosphate in the foregoing molar ratios.

---

Both the alkali metal nitrilotriacetates and the alkali metal tripolyphosphates are known to have good sequestration properties. It is known that in detergents and in washing compounds in many instances alkali metal nitrilotriacetates improve the cleaning properties. Furthermore, it is known that detergent compositions and water treating compositions that contain both alkali metal nitrilotriacetates and alkali metal tripolyphosphates are more desirable than compositions containing the polyphosphates alone. However, there are problems resulting from the use of nitrilotriacetates in such compositions. For example, the hygroscopicity of the nitrilotriacetates necessitates the use of special containers with a vapor barrier when mixtures of alkali metal nitrilotriacetates and polyphosphates are prepared in processes. Additionally, nitrilotriacetates are relatively different to dry.

The product of this invention, which is produced by the reaction of alkali metal trimetaphosphate and a strong base in the presence of nitrilotriacetates, is a light density particulate material which is suitable for blending with other ingredients to form a conventional detergent or a water-treatment product and is non-hygroscopic and therefore resistant to high humidities and to caking. Also the product of this invention can be dried much easier than the nitrilotriacetates or tripolyphosphates alone.

In accordance with this invention, it has been discovered that a relatively low bulk density sequestration agent containing alkali metal nitrilotriacetates and alkali metal tripolyphosphate in a molar ratio of from about 1:13 to about 2.2:1 can be produced by (a) preparing a basic aqueous mixture consisting essentially of at least about 13% by weight of water, from about 5% to about 60% by weight of alkali metal nitrilotriacetate and an amount of alkali metal base; the molar ratio of the base to the said alkali metal triacetate in said mixture being from about 1.1:1 to about 26:1; (b) thereafter adding to said mixture an amount of alkali metal trimetaphosphate sufficient to at least react with the base and a portion of the water and (c) drying the resulting composition to produce a porous granular product having a density below about 0.60 gram per cc., which is essentially free of the base and which contains alkali metal nitrilotriacetate and alkali metal tripolyphosphate in a molar ratio of about 1:13 to about 2.2:1.

It is believed to be surprising that products produced by the process of this invention will yield a low density product because when the order of addition of the base and alkali metal trimetaphosphate is reversed, a relatively dense product is produced. Additionally, it is believed that it is further unexpected that a product which is substantially free of a strong base, that is, a composition which contains less than about 1% strong base based upon the weight of the base of nitrilotriacetate and tripolyphosphate on an anhydrous basis, could be produced in this manner because when the order of addition of the strong base and alkali metal trimetaphosphate is reversed, the product produced contains unreacted sodium hydroxide.

The first step in the process in the production of the composition of this invention is preparing a mixture consisting essentially of an amount of a strong base, at least about 13% by weight of water and from about 5% to about 60% by weight of the mixture of nitrilotriacetate, the molar ratio of said base to said nitrilotriacetate being from about 1:1 to 26:1. The nitrilotriacetate can be added as the acid or a water-soluble salt of the acid. When the acid is used, enough base is added to neutralize the acid. In most instances, trisodium nitrilotriacetate will be used as the nitrilotriacetic acid source, although, if desired, potassium nitrilotriacetate can be used as well as the other alkali metal salts of the foregoing acid. Generally, sodium hydroxide will be the preferred strong base; however, potassium hydroxide and the other alkali metal hydroxides can be used, if desired. The amount of base will be dependent upon the particular ratio of alkali metal nitrilotriacetate to alkali metal tripolyphosphate that is desired in the finished product. Thus, the molar ratio of the base to alkali metal nitrilotriacetate will be from greater than 1.1:1 and can be as high as 26:1 with ratios of from about 2:1 to 20:1 being preferred. Use of larger amounts of base, that is, above a ratio of 26:1, requires that larger amounts of alkali metal trimetaphosphate must be added to react with the base. Such materials with the high level of phosphates are not desirable because the benefits from incorporating nitrilotriacetates into the formulations are not fully achieved. After the mixture, consisting essentially of the base, at least about 13% by weight of water and from about 5% to about 60% by weight of alkali metal nitrilotriacetate having the foregoing molar ratios of base and nitrilotriacetate is prepared, there is added to said mixture an amount of alkali metal trimetaphosphate sufficient to at least react with the base and a portion of the water. Larger than the theoretical amounts of alkali metal trimetaphosphate which will react with the strong base can be used and it is generally preferred to use about 1 to 5% excess alkali metal trimetaphosphate in order to insure that all of the base is reacted. Since the alkali metal trimetaphosphates are considered inert ingredients and do not detract appreciably from detergent performance in amounts below about 5% by weight, the beforementioned excess amounts of alkali metal trimetaphosphates are beneficial in many instances. Although larger amounts such as great as 50% excess can be used, the detergency performance is lowered by such large amounts of alkali metal trimetaphosphates. Although any alkali metal trimetaphosphate, such as sodium trimetaphosphate and potassium trimetaphosphate and the like can be used, it is generally preferred to use sodium trimetaphosphate since it is more readily available and costs are generally lower. At least about 13% by weight of water is used to achieve satisfactory mixing. If desired, amounts of water as high as 50% by weight or higher, such as 90% by weight, can be used; however, since water generally will be removed, the larger amounts, that is, above 50%, are not generally used. The percentages by weight are based upon the combined weight of caustic, water and alkali metal nitrilotriacetate.

While temperature control is not an essential variable in the process of this invention when the alkali metal trimetaphosphate is added to the mixture, it is generally preferred, for the maximum benefits of this invention, to control the temperatures of the mixture of nitrilotriacetic acid, strong base and water between 35° C. and about 90° C. because lower temperatures tend to cause a slower rate of reaction between the base and the alkali metal trimetaphosphates and processing time is extended. Use of temperatures above about 90° C. result in a rapid conversion of some of the alkali metal trimetaphosphate. The rapid conversion causes a significant amount of water to be evaporated from the reaction medium over a relatively short period of time and control of the reaction is rendered difficult and can result in unreacted alkali metal trimetaphosphate. Since alkali metal trimetaphosphate is not an active sequestrant, that is, only an insignificant amount of sequestration occurs until the ring structure is cleaved to form the alkali metal tripolyphosphates, the alkali metal trimetaphosphates are, therefore, considered inert materials in a sequestration composition and large amounts are not usually desirable, such as above 20% by weight of the detergent composition. In most instances, therefore, the temperature of the mixture to which the alkali metal trimetaphosphate is added is between about 35° C. and about 90° C. When sodium hydroxide is the strong base and sodium trimetaphosphate is the alkali metal trimetaphosphate, it is preferred to maintain the temperature of the mixture between about 40° C. and 85° C. The water content can be closely controlled during the preparation of the water-strong base-nitrilotriacetate mixture and during the alkali metal trimetaphosphate addition, there is enough heat generated in the exothermic trimetaphosphate-strong base reaction to dry the mixture to a sufficient degree to yield a product having a water content which is suitable for some uses. In many instances, however, an additional drying step is needed to lower the free water content to a desired level. Any conventional dryer can be used to dry the resulting product, such as rotary dryers, tray dryers, spray dryers, and the like.

When a material having a bulk density in the range of 0.30 to 0.50 gram per cc. is desired, a foaming agent is employed and a gas can be interdispersed during the time the strong base is reacting with the alkali metal trimetaphosphate to thereby create a light density foamed material. The class of foaming agents that can be used are described in Belgian Pat. No. 633,146 which is incorporated by reference herein. The foaming agents are generally used in amounts of less than about 5% by weight of the mixtures of water, foaming agent, nitrilotriacetic acid and strong base. Any gas which is inert to the raw materials or the finished product can be used. By inert it is meant that no by-products are formed from the raw materials or the finished product that will function appreciably different than the raw materials or the finished product. For example, although water or steam will react with some of the materials to form certain hydrates, these hydrates will generally function the same in the final application as the corresponding anhydrous salts. Examples of suitable gases include air, nitrous oxide, oxygen, nitrogen, fluorohydrocarbons and steam. The gas can be added directly or can be produced from a gas generating material added to the reaction mixture. In most instances, use of a gas generating material, air or steam will be preferred since these means are the most economical.

The unique sequestration composition consisting essentially of an alkali metal nitrilotriacetate and an alkali metal tripolyphosphate in molar ratios of from about 1:13 to about 2.2:1 and said salts constituting at least about 95% by weight of the total composition on an anhydrous basis and having a bulk density of below about 0.6 gram per cc. and being substantially free of a strong base is a subject of the present invention.

One preferred composition is the composition produced when sodium trimetaphosphate is reacted with sodium hydroxide in the presence of sodium nitrilotriacetate. The material produced is relatively non-hygroscopic. It is believed to be unexpected that the material is non-hygroscopic since a mixture of trisodium nitrilotriacetate and anhydrous sodium tripolyphosphate prepared by blending or mixing the two components is highly hygroscopic. Tests in Example 3 of this application compare such a mixture of trisodium nitrilotriacetate and sodium tripolyphosphate with a composition of this invention having substantially the same percentages of components.

In one of the preferred processes for producing the alkali metal nitrilotriacetate, the alkali metal nitrilotriacetate crystals are separated from an aqueous solution containing an excess of the alkali metal hydroxides. Since the alkali metal nitrilotriacetate crystals are formed in aqueous solutions of alkali metal hydroxides, the crystals are separated from the aqueous solution by filtration, centrifugation and the like. Drying of the wet cake is relatively difficult because of poor mass transfer rates. By utilizing the process of this invention, the separation step can be eliminated because the aqueous mixture containing alkali metal nitrilotriacetate, water and strong base produced by the above process is suitable as the mixture of strong base, water and nitrilotriacetic acid that is used in the process of this invention. The solids recovery step can be eliminated when it is desirable to produce a mixture of trisodium nitrilotriacetate and sodium tripolyphosphate. The drying step in the process of this invention is fast because the mass transfer rate through the voluminous surface of the light granules is fast.

To more fully illustrate the process of this invention, the following non-limiting examples are presented. All parts, proportions and percentages are by weight unless otherwise indicated.

EXAMPLE 1

About 69.5 parts of nitrilotriacetic acid, 5 parts of lauryl sulfate, 24 parts of water, and 217.5 parts of 50% sodium hydroxide solution are charged in to a reaction vessel equipped with a stirrer, and insulated to prevent heat loss. The mixture is stirred and 250 parts of sodium trimetaphosphate are added. After about 30 seconds, the mixture expands with evolving steam and converts to a porous mass of granular particles. After screening on a Standard 8 mesh sieve, USS Series, to remove a few lumps, the product is dried at 140° F. and analyzed for various characteristics. The product has about 20% water and its density is about 0.32 gram per cc. The trisodium nitrilotriacetate content of the product is determined to be about 20%, and of the phosphate present, over 90% is in the form of sodium tripolyphosphate hexahydrate. Analysis of a sample of the material on an anhydrous basis shows that more than 95% of the product is trisodium nitrilotriacetate and sodium tripolyphosphate hexahydrate.

EXAMPLE 2

About 31 parts of $N(CH_2COONa)_3$, 16 parts of sodium hydroxide, 53 parts of water and ½ part of lauryl sulfate are charged to a reactor as in Example 1 after the mixture is at about 45° C. About 61.2 parts of sodium trimetaphosphate are added while air is introduced through the sparger. In about 60 seconds the material has increased in volume about two times and about 4 parts of steam are evolved from the vessel. About 157 parts of a solid material having an $N(CH_2COONa)_3 \cdot H_2O$ content of about 21.1%, a $Na_5P_3O_{10} \cdot 6H_2O$ content of about 60.5% and a free water content of about 18.4% are discharged from the vessel to a rotary dryer. About 133 parts of a composition having a density of about 0.35 g./cc. is discharged from the dryer. A sample of the material has the following analysis:

| | Percent |
|---|---|
| $N(CH_2COONa)_3 \cdot H_2O$ | 25 |
| $Na_5P_3O_{10} \cdot 6H_2O$ | 71.5 |
| Free water | 3.5 |

EXAMPLE 3

A mixture containing about 31 parts of trisodium nitrilotriacetate, about 16 parts of sodium hydroxide and about 53 parts of water are charged into a conventional reaction vessel equipped with a heating coil and agitator. The mixture is heated to about 40° C. and about 61 parts of sodium trimetaphosphate are added. The reaction medium rises to about 110° C. and water vapor evolves from the mixture to form a solid material containing about 18% water. The material is dried in a rotary dryer with air at about 120° C. Analysis of a sample of the dried material indicates 25% trisodium nitrilotriacetate and 71.5% sodium tripolyphosphate hexahydrate. Samples of the material show essentially no caking when stored under varying temperature and humidity conditions. For example, no caking occurs when the material is stored at 90° F. with the relative humidity from about 65% to 85%, even after 21 days of storage. Additionally, another sample stored at 122° F. at 78% relative humidity also shows no caking. A mixture prepared by mixing trisodium nitrilotriacetate and sodium tripolyphosphate indicates that at humidities above about 60%, the mixtures cake into relatively large chunks.

EXAMPLE 4

A mixture containing about 400 parts of sodium nitrilotriacetate monohydrate, about 134 parts of a 50% sodium hydroxide solution, about 105 parts of water, about 4 parts of lauryl sulfate, and about 10 parts of ultramarine blue dye are charged into a conventional reaction vessel equipped with a heating coil an an agitator. The mixture is heated to about 85° C. and about 257 grams of sodium trimetaphosphate are added. After stirring for about 40 seconds, the temperature of the mixture rises to about 110° C. with the evolution of steam, and the mixture is converted to a porous mass of light blue granules. After screening on a Standard 8 mesh sieve, USS Series, to remove a few lumps, the product is dried at 140° F. and analyzed for various characteristics. The results of the analysis are shown in Table I.

TABLE I

| Product analyses: | Percent |
|---|---|
| NTA (anhydrous basis) | 47 |
| Sodium tripolyphosphate (anhydrous basis) | 38 |
| Water | 14 |

Particle size distribution:
 Retained on 60 mesh, USS series—89%
 Retained on 100 mesh, USS series—97%
 Bulk density, grams per cc.—0.5

What is claimed is:
1. A process for producing a sequestration composition for use in detergent formulations, said composition being in granular form and having a bulky density of 0.32 gram per cc., which process comprises:
 (a) Charging about 69.5 parts of nitrilotriacetic acid, 5 parts of lauryl sulfate, 24 parts of water and 217.5 parts of 50% sodium hydroxide solution into a reaction vessel equipped with a stirrer, and insulated to prevent heat loss;
 (b) Stirring the mixture and adding 250 parts of sodium trimetaphosphate thereto, whereby a reaction occurs which causes the mixture to expand with the evolution of steam and converts the mixture to a mass of porous particles; and
 (c) Screening the granular product and drying said product at 140° F.

References Cited

UNITED STATES PATENTS

| 3,055,835 | 9/1962 | Monick | 252—138 |
| 3,303,134 | 2/1967 | Shen et al. | 252—137X |
| 3,345,297 | 10/1967 | Meyer et al. | 252—138X |
| 3,390,093 | 6/1968 | Feierstein et al. | 252—137X |

OTHER REFERENCES

| 1,046,863 | 10/1966 | Great Britain | 252—137 |

HERBERT B. GUYNN, Primary Examiner

D. L. ALBRECHT, Assistant Examiner

U.S. Cl. X.R.

23—107; 252—110, 138